United States Patent
Fletcher et al.

(10) Patent No.: US 10,100,720 B2
(45) Date of Patent: Oct. 16, 2018

(54) CRANKCASE VENTILATING EVACUATOR

(71) Applicants: David E. Fletcher, Flint, MI (US);
Brian M. Graichen, Leonard, MI (US);
James H. Miller, Ortonville, MI (US);
Keith Hampton, Ann Arbor, MI (US)

(72) Inventors: David E. Fletcher, Flint, MI (US);
Brian M. Graichen, Leonard, MI (US);
James H. Miller, Ortonville, MI (US);
Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 279 days.

(21) Appl. No.: 14/989,177

(22) Filed: Jan. 6, 2016

(65) Prior Publication Data
US 2016/0201552 A1    Jul. 14, 2016

Related U.S. Application Data

(60) Provisional application No. 62/101,652, filed on Jan. 9, 2015.

(51) Int. Cl.
    F02B 37/00    (2006.01)
    F02M 25/06    (2016.01)
    F01M 13/02    (2006.01)

(52) U.S. Cl.
    CPC ......... F02B 37/004 (2013.01); F01M 13/021 (2013.01); F02M 25/06 (2013.01);
    (Continued)

(58) Field of Classification Search
    CPC ........ F02B 37/004; F02B 37/16; F16K 24/04; F16K 37/0033; F02M 25/06; F01M 13/021
    See application file for complete search history.

(56) References Cited

U.S. PATENT DOCUMENTS 1,845,969 A    2/1932    Hueber
2,037,884 A    4/1936    Day
(Continued)

FOREIGN PATENT DOCUMENTS

CN    2400655       10/2000
CN    1724298 A     1/2006
(Continued)

OTHER PUBLICATIONS

Plastic Vacuum Ejector Generator Pneumatic Fitting ZH07DS (first published at least as early as Dec. 29, 2015).
(Continued)

*Primary Examiner* — Jacob Amick
(74) *Attorney, Agent, or Firm* — FisherBroyles, LLP; Susan M. Oiler

(57) ABSTRACT

A turbocharged engine air system is disclosed. The system includes a vacuum consuming device, a turbocharger having a compressor fluidly connected to an intake manifold of an engine, a first check valve located upstream of the compressor, a second check valve located downstream of the compressor and upstream of the intake manifold, and an evacuator. The evacuator includes a converging motive section, a diverging discharge section, at least one suction port, and a Venturi gap located between an outlet end of the converging motive section and an inlet end of the diverging discharge section. The diverging discharge section of the evacuator is fluidly connected to both the first check valve and the second check valve. The suction port is fluidly connected to the vacuum consuming device.

18 Claims, 7 Drawing Sheets

(52) U.S. Cl.
CPC . *F01M 2013/026* (2013.01); *F01M 2013/027* (2013.01); *Y02T 10/121* (2013.01)

(56) References Cited

U.S. PATENT DOCUMENTS

| | | | |
|---|---|---|---|
| 2,183,561 A | 12/1939 | Hamblin |
| 2,274,276 A | 2/1942 | Rappl |
| 2,396,290 A | 3/1946 | Schwarz |
| 2,449,683 A | 9/1948 | Akernan et al. |
| 2,512,479 A | 6/1950 | Callejo |
| 2,626,009 A | 1/1953 | Sebok et al. |
| 2,954,091 A | 9/1960 | McMichael |
| 3,093,153 A | 6/1963 | Horowitz |
| 3,145,724 A | 8/1964 | Pelzer |
| 3,234,932 A | 2/1966 | Bird et al. |
| 3,430,437 A | 3/1969 | Saussele et al. |
| 3,581,850 A | 6/1971 | Jaitl |
| 3,754,841 A | 8/1973 | Grabb et al. |
| 3,826,281 A | 7/1974 | Clark |
| 3,842,932 A | 10/1974 | Gibel |
| 3,923,081 A | 12/1975 | Persson |
| 4,208,921 A | 6/1980 | Keyes |
| 4,211,200 A | 7/1980 | Rocchio et al. |
| 4,308,138 A | 12/1981 | Woltman |
| 4,354,492 A | 10/1982 | McPhee |
| 4,380,418 A | 4/1983 | Crawford et al. |
| 4,424,883 A | 1/1984 | Musiani |
| 4,499,034 A | 2/1985 | McAllister |
| 4,519,423 A | 5/1985 | Ho et al. |
| 4,554,786 A | 11/1985 | Takeuchi et al. |
| 4,556,086 A | 12/1985 | Raines |
| 4,634,559 A | 1/1987 | Eckert |
| 4,683,916 A | 8/1987 | Raines |
| 4,759,691 A | 7/1988 | Kroupa |
| 4,893,654 A | 1/1990 | Feuz |
| 4,938,309 A | 7/1990 | Emdy |
| 4,951,708 A | 8/1990 | Miller |
| 5,005,550 A | 4/1991 | Bugin, Jr. et al. |
| 5,069,062 A | 12/1991 | Malecek et al. |
| 5,108,266 A | 4/1992 | Hewitt |
| 5,188,141 A | 2/1993 | Cook et al. |
| 5,291,916 A | 3/1994 | Kloosterman et al. |
| 5,326,942 A | 7/1994 | Schmid |
| 5,375,621 A | 12/1994 | Gaehwiler |
| RE35,532 E | 6/1997 | Duren |
| 5,816,446 A | 10/1998 | Steindorf et al. |
| 5,881,759 A | 3/1999 | Andersson |
| 6,035,881 A | 3/2000 | Emmerich et al. |
| RE37,090 E | 3/2001 | Kloosterman et al. |
| 6,220,271 B1 | 4/2001 | Emmerich et al. |
| 6,308,731 B1 | 10/2001 | Kawasaki |
| 6,325,602 B1 | 12/2001 | Rademacher |
| 6,619,322 B1 | 9/2003 | Wojciechowski et al. |
| 6,626,249 B2 | 9/2003 | Rosa |
| 7,029,103 B2 | 4/2006 | Iida |
| 7,100,587 B2 | 9/2006 | Ahlborn et al. |
| 7,353,812 B1 | 4/2008 | Gosdzinski et al. |
| 7,610,140 B2 | 10/2009 | Hirooka |
| 7,628,170 B2 | 12/2009 | Kok-Hiong et al. |
| 7,673,653 B2 | 3/2010 | Mijers et al. |
| 7,722,132 B2 | 5/2010 | Carlsson |
| 8,136,548 B2 | 3/2012 | Trueb |
| 8,147,225 B2 | 4/2012 | Kuny |
| 8,517,056 B2 | 8/2013 | Cullin |
| 8,839,607 B2 | 9/2014 | Pursifull et al. |
| 9,074,523 B2 | 7/2015 | Ulrey et al. |
| 9,133,796 B2 | 9/2015 | Plymale et al. |
| 9,827,963 B2 | 11/2017 | Fletcher et al. |
| 2002/0002997 A1 | 1/2002 | Steinruck et al. |
| 2002/0027041 A1 | 3/2002 | Czabala et al. |
| 2004/0036185 A1 | 2/2004 | Garcia |
| 2004/0113288 A1 | 6/2004 | Korzeniowski |
| 2005/0045417 A1 | 3/2005 | Ni |
| 2005/0061378 A1 | 3/2005 | Foret |
| 2005/0121084 A1 | 6/2005 | Andersson |
| 2005/0257838 A1 | 11/2005 | Enerson |
| 2006/0016477 A1 | 1/2006 | Zaparackas |
| 2007/0044848 A1 | 3/2007 | Norman |
| 2007/0152355 A1 | 7/2007 | Hartley |
| 2008/0007113 A1 | 1/2008 | Choi |
| 2008/0121480 A1 | 5/2008 | Kawamori et al. |
| 2008/0145238 A1 | 6/2008 | Shibayama et al. |
| 2011/0132311 A1 | 6/2011 | Pursifull et al. |
| 2011/0186151 A1 | 8/2011 | Sparazynski |
| 2012/0024249 A1 | 2/2012 | Fuhrmann et al. |
| 2013/0139911 A1 | 6/2013 | Wilson et al. |
| 2013/0213510 A1 | 8/2013 | Burnham et al. |
| 2013/0233276 A1 | 9/2013 | Pursifull et al. |
| 2013/0233287 A1 | 9/2013 | Leone |
| 2013/0340732 A1 | 12/2013 | Pursifull et al. |
| 2014/0014080 A1 | 1/2014 | Beshay et al. |
| 2014/0123941 A1* | 5/2014 | Ulrey ............... F02M 35/10229 123/350 |
| 2014/0165962 A1 | 6/2014 | Pursifull |
| 2014/0196694 A1 | 7/2014 | Euliss et al. |
| 2014/0197345 A1 | 7/2014 | Graichen et al. |
| 2014/0217679 A1 | 8/2014 | Barrall et al. |
| 2014/0360607 A1 | 12/2014 | Fletcher et al. |
| 2014/0366527 A1 | 12/2014 | Fletcher et al. |
| 2015/0101328 A1* | 4/2015 | Surnilla ............... F02D 41/005 60/599 |
| 2015/0114348 A1 | 4/2015 | Pursifull et al. |
| 2015/0114350 A1 | 4/2015 | Pursifull |
| 2015/0147196 A1 | 5/2015 | Chahal et al. |
| 2015/0158477 A1 | 6/2015 | Luehrsen |
| 2015/0159677 A1 | 6/2015 | Hampton et al. |
| 2016/0010661 A1 | 1/2016 | Fletcher et al. |
| 2016/0040688 A1 | 2/2016 | Fletcher et al. |
| 2016/0186694 A1 | 6/2016 | Wakamatsu et al. |

FOREIGN PATENT DOCUMENTS

| | | |
|---|---|---|
| CN | 201109426 | 9/2008 |
| CN | 201377408 Y | 1/2010 |
| CN | 201907500 | 7/2011 |
| CN | 103407441 | 11/2013 |
| CN | 203394893 U | 1/2014 |
| CN | 203485907 U | 3/2014 |
| DE | 3809837 A1 | 10/1988 |
| DE | 4310761 | 10/1994 |
| DE | 202013008611 U1 | 9/2014 |
| DE | 102013006954 A1 | 10/2014 |
| EP | 0442582 A1 | 8/1991 |
| EP | 0545121 | 6/1993 |
| GB | 190603061 | 11/1906 |
| GB | 2110344 A | 6/1983 |
| GB | 2129516 | 5/1984 |
| JP | 2001-295800 | 10/2001 |
| JP | 2007-327453 | 12/2007 |
| JP | 2009168134 | 7/2009 |
| WO | 2007/050011 A1 | 5/2007 |
| WO | 2008/014306 A2 | 1/2008 |
| WO | 2010054900 A1 | 5/2010 |
| WO | 2015/089176 | 6/2015 |

OTHER PUBLICATIONS

Racing Vacuum Pump PE 10000-01; http://www.product-engr.com/vacuum_pump.html (first published at least as early as Feb. 20, 2011).
PCT, International Search Report and Written Opinion, PCT/US2014/041250 (dated Oct. 27, 2014).
PCT, International Search Report and Written Opinion, PCT/US2014/059672 (dated Jan. 9, 2015).
PCT, International Search Report and Written Opinion, PCT/US2015/012018 (dated May 8, 2015).
PCT, International Search Report and Written Opinion, PCT/US2015/024195 (dated Jul. 24, 2015).
PCT, International Search Report and Written Opinion, PCT/US2015/033079 (dated Aug. 21, 2015).
PCT, International Search Report and Written Opinion, PCT/US2015/039950 (dated Oct. 5, 2015).

(56) References Cited

OTHER PUBLICATIONS

PCT, International Search Report and Written Opinion, PCT/US2015/043911 (dated Nov. 6, 2015).
PCT, International Search Report and Written Opinion, PCT/US2016/012260 (dated Mar. 16, 2016).
U.S. Non-Final Office Action, U.S. Appl. No. 14/294,727; (dated Oct. 8, 2015).
U.S. Non-Final Office Action, U.S. Appl. No. 14/565,075; (dated Nov. 16, 2015).
U.S. Non-Final Office Action, U.S. Appl. No. 14/509,612; (dated Dec. 18, 2015).
U.S. Non-Final Office Action, U.S. Appl. No. 14/600,598; (dated Feb. 11, 2016).
U.S. Final Office Action, U.S. Appl. No. 14/565,075;(dated Apr. 1, 2016).
U.S. Final Office Action, U.S. Appl. No. 14/294,727; (dated Apr. 22, 2016).
English translation of JP07-117010, accessed Nov. 9, 2015, <https://www4.j-platpat.inpit.go.jp/cgi-bin/tran_web_cgi_ejje?u=http://www4.j-platpat.inpit.go.jp/eng/translation/20151110030429-332207917469240101009 32AF2D1BD4629B191303A22964BC2-FC8>.
U.S. Advisory Action; U.S. Appl. No. 14/509,612; (dated Sep. 1, 2016).
U.S. Notice of Allowance; U.S. Appl. No. 14/509,612; (dated Oct. 17, 2016).
U.S. Notice of Allowance; U.S. Appl. No. 14/600,598; (dated Nov. 10, 2016).
CN, Office Action and Search Report with English translation; Chinese Patent Application No. 201410413220.7; (dated Nov. 14, 2016).
CN, Office Action with English translation; Chinese Patent Application No. 201480001422.9; 19 pages (dated Feb. 16, 2017).
EP, Supplementary European Search Report; Patent Application No. 14811266.7; 5 pages (dated Apr. 5, 2017).
CN, First Office Action and Search Report with English translation; Patent Application No. 2015800003002; 11 pages (dated Apr. 6, 2017).
EP, Extended European Search Report; Patent Application No. 14852220.4, Applicant Dayco IP Holdings, LLC, 6 pages (dated May 10, 2017).
CN, Office Action with English translation; Chinese Patent Application No. 2015800050465, Applicant Dayco IP Holdings, LLC, 7 pages (dated Jul. 4, 2017).
CN, Search Report with English translation; Chinese Patent Application No. 2015800050465, Applicant Dayco IP Holdings, LLC, 4 pages (dated Jul. 4, 2017).
CN Search Report with English Translation, Chinese Patent Application No. 201580042186X dated Oct. 31, 2017 (3 pages).
CN, Second Office Action with English Translation, Chinese Application No. 201410413220.7 dated Jul. 18, 2017 (5 pages).
CN, Third Office Action, Supplemental Search Report with English Translation, Chinese Application No. 201410413220.7 dated Jan. 3, 2018 (6 pages).
EP, Search Report, Application No. 15737914.0 filed Jul. 7, 2017 (8 pages).
CN, Search Report with English translation; Chinese Patent Application No. 201480001422.9; (dated Jul. 20, 2016).
CN, Office Action with English translation; Chinese Patent Application No. 201480001422.9; (dated Aug. 1, 2016).
U.S. Final Office Action; U.S. Appl. No. 14/600,598; (dated Aug. 19, 2016).
U.S. Final Office Action; U.S. Appl. No. 14/509,612; (dated Jun. 22, 2016).
EP, Supplemental Search Report: European Application No. 15818552.0 (dated Mar. 7, 2018).
CN, Third Office Action English Translation; Chinese Application No. 201410413220.7 (dated Jan. 17, 2018).
JP, Non-Final Office Action with English Translation; Japanese Application No. 2016-519556 (dated May 18, 2018).
EP, Supplemental Search Report; European Application No. 15830300.8 (dated May 29, 0218).
U.S., First Office Action; U.S. Appl. No. 15/791,561 (dated Jul. 26, 2018).
U.S., Final Office Action; U.S. Appl. No. 14/796,447 (dated May 11, 2018).
EP, European Supplemental Search Report; European Application No. 16735329.1 (dated Jul. 19, 2018).

\* cited by examiner

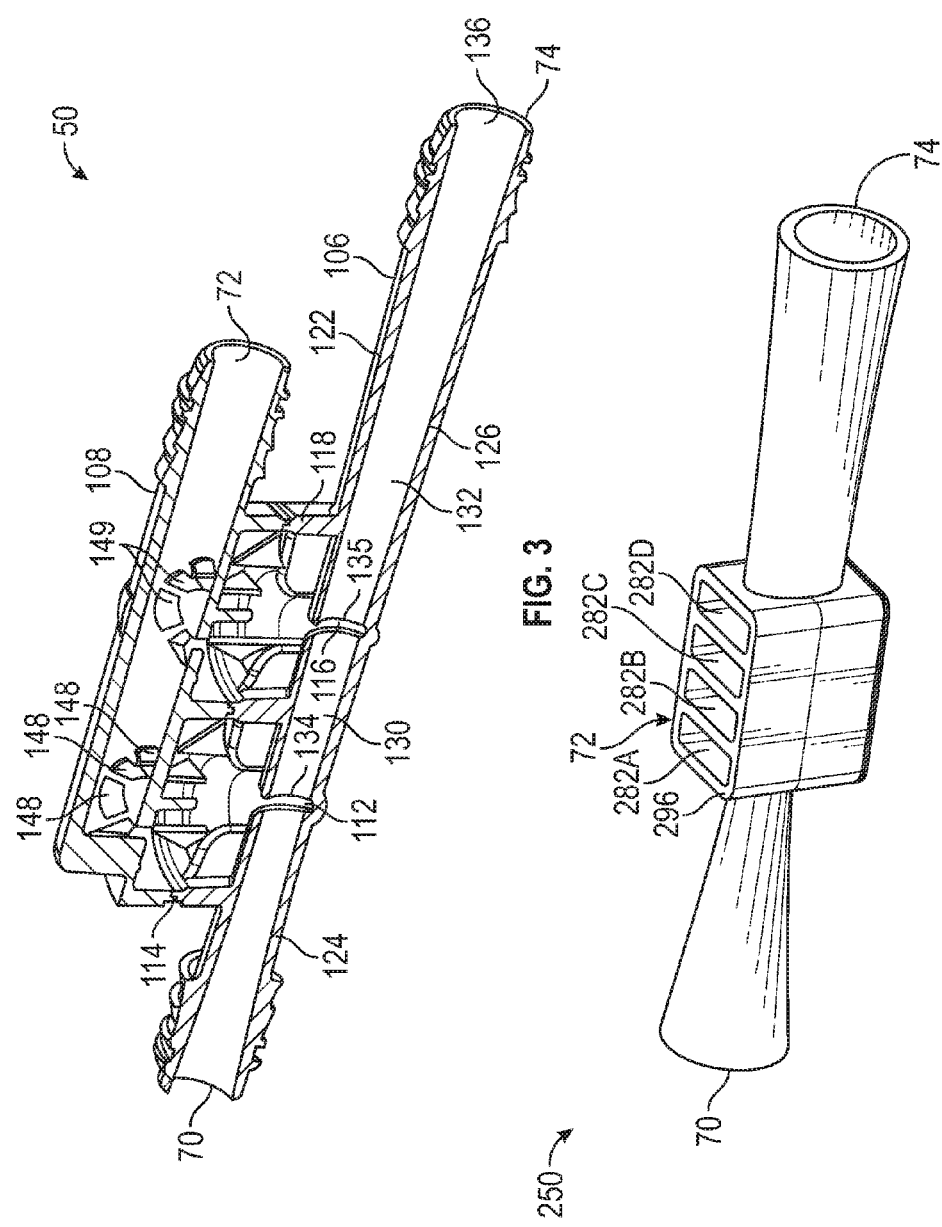

CRANKCASE VENTILATING EVACUATOR

RELATED APPLICATIONS

This application claims the benefit of U.S. Provisional Application No. 62/101,652, filed on Jan. 9, 2015.

TECHNICAL FIELD

This application relates to an operating system generating vacuum using an evacuator, and in particular to an operating system where an evacuator provides vacuum at all operating conditions to a crankcase ventilation system in a turbocharged engine air system.

BACKGROUND

In some vehicles, vacuum is used to operate or assist in the operation of various devices. For example, vacuum may be used to assist a driver applying vehicle brakes, crankcase ventilation, turbocharger operation, fuel vapor purging, heating and ventilation system actuation, and driveline component actuation. If the vehicle does not produce vacuum naturally, such as from the intake manifold, then a separate vacuum source is required to operate such devices. For example, in some boosted engines where intake manifold pressures are often at pressures greater than atmospheric pressure, intake manifold vacuum may be replaced or augmented with vacuum from an evacuator.

As used herein, an evacuator is defined as a converging, diverging nozzle assembly with three connections, a motive port, a discharge port, and a suction port connected to a device requiring vacuum. The evacuator may be an ejector or an aspirator, depending on the pressures at the motive and discharge ports. Specifically, if the pressure at the motive port of the evacuator is at atmospheric pressure and if the discharge port is less than atmospheric pressure, then the evacuator may operate as an aspirator. If the pressure at the motive port of the evacuator is greater than atmospheric pressure and the discharge port of the evacuator is less than the pressure at the motive port but at least atmospheric pressure, then the evacuator operates as an ejector. A low pressure region may be created within the evacuator so that air can be drawn from a vacuum reservoir or may directly act on a device requiring vacuum, thereby reducing pressure within the vacuum reservoir or device requiring vacuum.

Those skilled in the art will readily appreciate that boosted engines (i.e., engines including a turbocharger for improving the power output and overall efficiency) require crankcase ventilation at all operating conditions. Accordingly, there is a continuing need in the art for an evacuator that provides vacuum at all operating conditions to a crankcase ventilation system in a turbocharged engine air system.

SUMMARY

In one embodiment, a turbocharged engine air system is disclosed. The system includes a vacuum consuming device, a turbocharger having a compressor fluidly connected to an intake manifold of an engine, a first check valve located upstream of the compressor, a second check valve located downstream of the compressor and upstream of the intake manifold, and an evacuator. The evacuator includes a converging motive section, a diverging discharge section, at least one suction port, and a Venturi gap located between an outlet end of the converging motive section and an inlet end of the diverging discharge section. The diverging discharge section of the evacuator is fluidly connected to both the first check valve and the second check valve. The suction port is fluidly connected to the vacuum consuming device. The first check valve and the second check valve ensure that a pressure at the converging motive section of the evacuator is always greater than a pressure at the diverging discharge section of the evacuator.

In another embodiment, a turbocharged engine air system is disclosed. The system includes a crankcase ventilation system having an oil mist separator with an outlet, a turbocharger having a compressor fluidly connected to an intake manifold of an engine, a first check valve located upstream of the compressor, a second check valve located downstream of the compressor and upstream of the intake manifold, and an evacuator. The evacuator includes a converging motive section, a diverging discharge section, at least one suction port, and a Venturi gap located between an outlet end of the converging motive section and an inlet end of the diverging discharge section. The diverging discharge section of the evacuator is fluidly connected to both the first check valve and the second check valve. The suction port is fluidly connected to the outlet of the oil mist separator of the crankcase ventilation system. The first check valve and the second check valve ensure that a pressure at the converging motive section of the evacuator is always greater than a pressure at the diverging discharge section of the evacuator.

BRIEF DESCRIPTION OF THE DRAWINGS

FIG. 3 is a cross-sectional view of the evacuator shown in FIG. 2.

FIG. 4 is a perspective view of another embodiment of the evacuator shown in FIG. 1.

DETAILED DESCRIPTION

Figure 1:
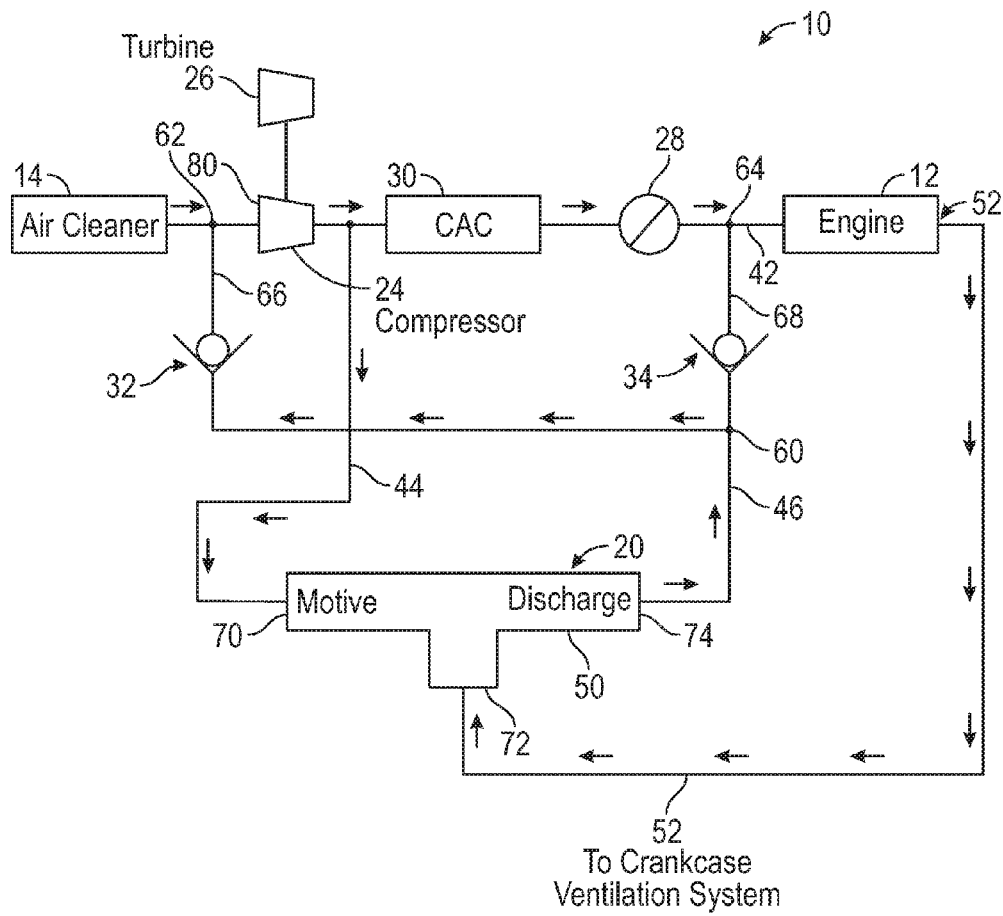
FIG. 1 is a schematic diagram including flow paths and flow directions of one embodiment of an internal combustion engine turbo system including an evacuator.

The following detailed description will illustrate the general principles of the invention, examples of which are additionally illustrated in the accompanying drawings. In the drawings, like reference numbers indicate identical or functionally similar elements. As used herein, the term fluid may include any liquid, suspension, colloid, gas, plasma, or combinations thereof.

Referring now to FIG. 1, an exemplary turbocharged engine air system 10 for providing vacuum is disclosed. The engine air system 10 may include an internal combustion engine 12, an air cleaner 14, an evacuator 20, a compressor 24, a turbine 26, a throttle 28, a charge air cooler (CAC) 30, a first check valve 32, and a second check valve 34. The internal combustion engine 12 may be, for example, a spark ignited (SI) engine or a compression ignition (CI) engine. In one embodiment, the internal combustion engine 12 may be included in an electric motor/battery system that is part of a hybrid vehicle. In the embodiment as shown in FIG. 1, the internal combustion engine 12 is boosted. This means that the compressor 24 and turbine 26 may be part of a turbocharger for improving the power output and overall efficiency of the internal combustion engine 12. The turbine 26 may include a turbine wheel (not illustrated in FIG. 1) that harnesses and converts exhaust energy into mechanical work through a common shaft 40 to turn a compressor wheel (not illustrated in FIG. 1) of the compressor 24. The compressor wheel ingests, compresses, and feeds air at elevated operating pressures into an intake manifold 42 of the internal combustion engine 12.

The evacuator 20 is supplied air from the compressor 24. Specifically, clean air at atmospheric pressure exits the air cleaner 14 and may be compressed by the compressor 24 before passing through the evacuator 20. As explained in greater detail below, the evacuator 20 may be used to provide vacuum to a crankcase ventilation system 52 of the engine 12. In particular, the evacuator 20 allows for positive crankcase ventilation as the engine 12 operates at all conditions (i.e., while the engine 12 is under boost and at part load).

The CAC 30 may be located downstream of the compressor 24 and upstream of the throttle 28. The throttle 28 may be located downstream of the air cleaner 14, the compressor 24, and the CAC 30, and upstream of the intake manifold 42 of the internal combustion engine 12. The throttle 28 may be opened as an operator depresses upon an accelerator pedal (not shown). When the throttle 28 is opened, compressed air from the compressor 24 is free to fill the intake manifold 42 of the internal combustion engine 12, thereby increasing the pressure at the intake manifold 42. Those skilled in the art will appreciate that the throttle 28 may be positioned in a plurality of partially opened positions based on the amount of depression of the accelerator (not shown). Since the engine air system 10 is turbocharged, the pressure at the intake manifold 42 may increase to a pressure that is above atmosphere as the throttle 28 is opened.

Figure 2:
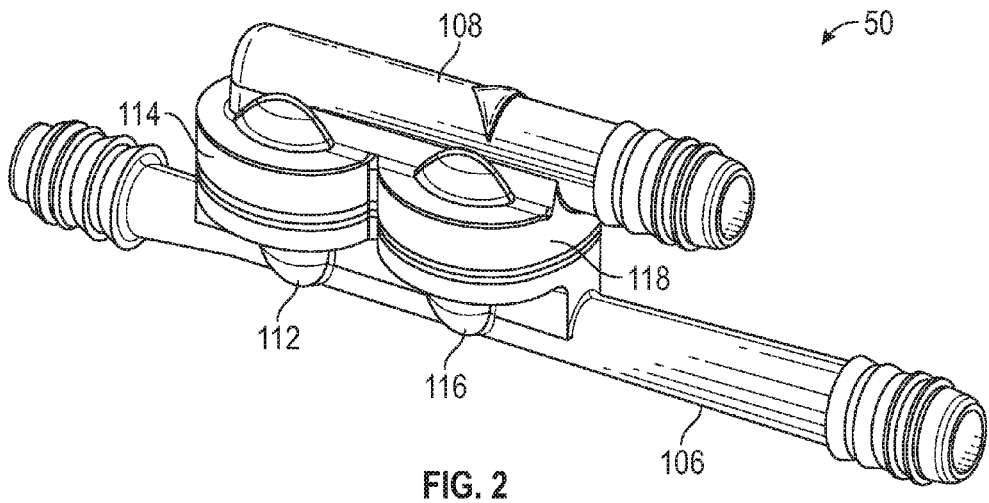
FIG. 2 is a perspective view of one embodiment of the evacuator shown in FIG. 1.

The evacuator 20 may include a first engine air connection 44, a second engine air connection 46, and a pneumatically actuated vacuum pump 50. One embodiment of the pneumatically actuated vacuum pump 50 is shown in FIG. 2, and is described in greater detail below. Turning back to FIG. 1, the first engine air connection 44 of the evacuator 20 may be fluidly connected to the engine air system 10 at a location upstream of the CAC 30 and downstream of the compressor 24. However, in an alternative embodiment, the first engine air connection 44 may be located downstream of the CAC 30 and upstream of the throttle 28.

A junction 60 may be located along the second engine air connection 46 of the engine air system 10. The junction 60 may branch off into two fluid conduits that are fluidly connected to the engine air system 10 at two discrete locations 62, 64. The first location 62 is upstream of the compressor 24 and downstream of the air cleaner 14. The first check valve 32 may be located within a fluid conduit 66 connected to the first location 62 and the junction 60. The second location 64 is located upstream of the intake manifold 42 and downstream of the throttle 28. The second check valve 34 may be located within a fluid conduit 68 connected to the second location 64 and the junction 60.

FIG. 2 is a perspective view of one embodiment of the evacuator 20 shown in FIG. 1, and illustrates the pneumatically actuated vacuum pump 50. Referring to both FIGS. 1 and 2, the pneumatically actuated vacuum pump 50 may operate as an ejector within the engine air system 10. That is, the pneumatically actuated vacuum pump 50 is connected to a pressure source above atmospheric pressure (e.g., boost pressure from the compressor 42) and discharges air to any portion of the system 10 lower than boost pressure.

Figure 8:
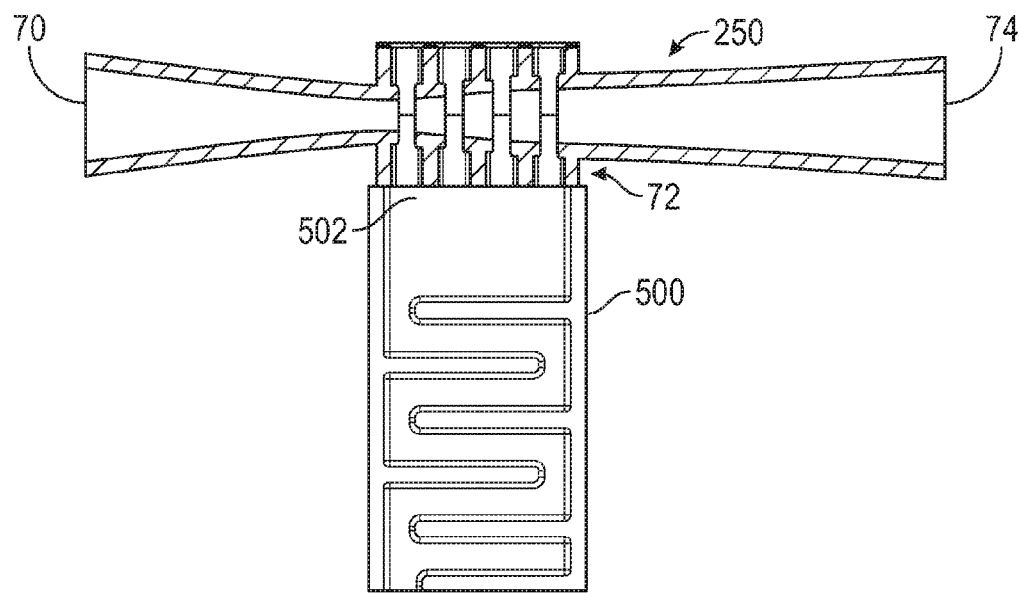
FIG. 8 illustrates the evacuator shown in FIGS. 2-3 connected to an outlet of an oil mist separator.

Continuing to refer to FIGS. 1-2, as used herein, the pneumatically actuated vacuum pump 50 may be a converging, diverging nozzle assembly with three or more connections. The pneumatically actuated vacuum pump 50 may include a motive port 70 fluidly connected to the engine air connection 44, a discharge port 74 fluidly connected to the engine air connection 46, and one or more suction ports 72 fluidly connected to the crankcase ventilation system 52 of the internal combustion engine 12. Although the figures illustrate the suction port 72 fluidly connected to the crankcase ventilation system 52, it is to be understood that the suction port 72 may also be connected to other types of vacuum consuming devices such as, for example, a brake boost canister. The motive port 70 of the pneumatically actuated vacuum pump 50 may be in fluid communication with the engine air system 10 at a location downstream of the compressor 24, and the discharge port 74 of the pneumatically actuated vacuum pump 50 may be in fluid communication with the engine air system 10 at both the first location 62 as well as the second location 64. In one embodiment, the suction port 72 of the pneumatically actuated vacuum pump 50 may be fluidly connected to the crankcase ventilation system 52 of the internal combustion engine 12 at an outlet of an oil mist separator of the crankcase ventilation system 52. The oil mist separator is illustrated in FIG. 8. However, it is to be understood that the oil mist separator illustrated in FIG. 8 is installed with an alternative embodiment of the pneumatically actuated vacuum pump 50.

In one embodiment, the pneumatically actuated vacuum pump 50 may be constructed of a material that withstands temperatures of at least 200° C. in order to accommodate the elevated temperature of the air which exits the compressor 24 of the turbocharger. For example, in one embodiment, the pneumatically actuated vacuum pump 50 may be constructed of a plastic such as polyphenylene sulfide (PPS) which is sold under the trade name Ryton®, a metallic material such as aluminium or magnesium, and polypropylene (either alone or with various fillers, such as glass fiber, mineral, or other strengthening agents).

FIG. 3 is a cross-sectioned view of the pneumatically actuated vacuum pump 50 shown in FIG. 2. Referring to both FIGS. 2-3, the pneumatically actuated vacuum pump 50 may be a multi-Venturi evacuator. It is to be understood that FIGS. 2-3 are merely exemplary in nature, and that the disclosure should not be limited to only a multi-Venturi evacuator. For example, in an alternative embodiment, a single Venturi evacuator may be used instead. However, those skilled in the art will readily appreciate that one advantage of a multi-Venturi evacuator is that the evacuator may produce a useable vacuum over a wider range of fluid flow pressures (for example, boost pressures) compared to evacuators having only a single Venturi gap.

The pneumatically actuated vacuum pump 50 includes a lower body portion 106 and an upper body portion 108 that when assembled together define a first portion 114 aligned with a first Venturi gap 112 in the lower body portion 106 and a second portion 118 aligned with a second Venturi gap 116 in the lower body portion 106. The lower body portion 106 of the pneumatically actuated vacuum pump 50 defines a conduit 122 that includes a first Venturi gap 112 separating the conduit 122 into a converging section 124 and a diverging section 126. The converging section 124 and the diverging section 126 both define continuously, gradually tapering inner passageways that narrow as they approach the first Venturi gap 112 and create a Venturi effect on high pressure fluid as the high pressure fluid passes from the converging section 124 into the diverging section 126. The second Venturi gap 116 is positioned downstream of the first Venturi gap 112, and separates the diverging section 126 of the pneumatically actuated vacuum pump 50 into a first portion 130 and a second portion 132. The first portion 130 is located between the first and second Venturi gaps 112, 116 and includes a discharge 134 of the first Venturi gap 112. The second portion 132 is located downstream of a discharge 135 of the second Venturi gap 116, and extends to a discharge outlet 136 of the pneumatically actuated vacuum pump 50.

The converging section 124 of the conduit 122 is fluidly connected to the motive port 70 of the pneumatically actuated vacuum pump 50. The motive inlet 70 of the pneumatically actuated vacuum pump 50 is connectable to the first engine air connection 44 (FIG. 1) of the engine air system 10. The diverging section 126 of the conduit 122 is fluidly connected to the discharge port 74 of the pneumatically actuated vacuum pump 50. The discharge port 74 of the pneumatically actuated vacuum pump 50 is connectable to the second engine air connection 46 (FIG. 2) of the engine air system 10. The upper body portion 108 of the pneumatically actuated vacuum pump 50 defines the suction port 72. The upper body portion 108 may also define one or more first openings 148 therein in fluid communication with the first portion 114 and the first Venturi gap 112. The upper body portion 108 may further define one or more second openings 149 therein in fluid communication with the second portion 118 and the second Venturi gap 116. The suction port 72 of the pneumatically actuated vacuum pump 50 is connectable to the crankcase ventilation system 52 (shown in FIG. 1) of the engine air system 10.

The Venturi gaps 112, 116 of the pneumatically actuated vacuum pump 50 may be exposed to air from an outlet of an oil mist separator of the crankcase ventilation system 52 (the oil mist separator is illustrated in FIG. 8 and is described in greater detail below). As seen in FIG. 3, the Venturi gaps 112, 116 of the pneumatically actuated vacuum pump 50 are separated from one another, and do not draw air from one another (i.e., there is no cross-flow between the Venturi gaps 112, 116). Instead, the Venturi gaps 112, 116 of the pneumatically actuated vacuum pump 50 only draw air from the oil mist separator. A complete description of the pneumatically actuated vacuum pump 50 is described in co-pending application Nos. 62/022,839 filed on Jul. 10, 2014, 61/929,264 filed Jan. 20, 2014, and 61/888,186 filed Oct. 8, 2013, which are all herein incorporated by reference in their entirety.

In the embodiment as shown in FIG. 3, the pneumatically actuated vacuum pump 50 does not include any type of check valve elements located in either the first portion 114 or the second portion 118 of the pneumatically actuated vacuum pump 50. In other words, the evacuator 20 shown in FIG. 1 of the disclosure does not include any check valves. Accordingly, sealing members are not located within either the first portion 114 or the second portion 118 of the pneumatically actuated vacuum pump 50. However, it is to be appreciated that in another embodiment, check valves could be included as well.

Referring to FIGS. 1-3, the check valves 32, 34 of the engine air system 10 are fluidly connected to the discharge port 74 of the pneumatically actuated vacuum pump 50. Specifically, the first check valve 32 only admits air from the discharge port 74 of the pneumatically actuated vacuum pump 50 into a compressor inlet 80. The second check valve 34 only admits air from the discharge port 74 of the pneumatically actuated vacuum pump 50 into the intake manifold 42 of the engine 12. The check valves 32, 34 are provided to ensure that a pressure at the motive inlet 70 of the pneumatically actuated vacuum pump 50 is always greater than a pressure at the discharge port 74 of the pneumatically actuated vacuum pump 50 (i.e., a positive pressure differential always exists across the pneumatically actuated vacuum pump 50).

Figure 5:
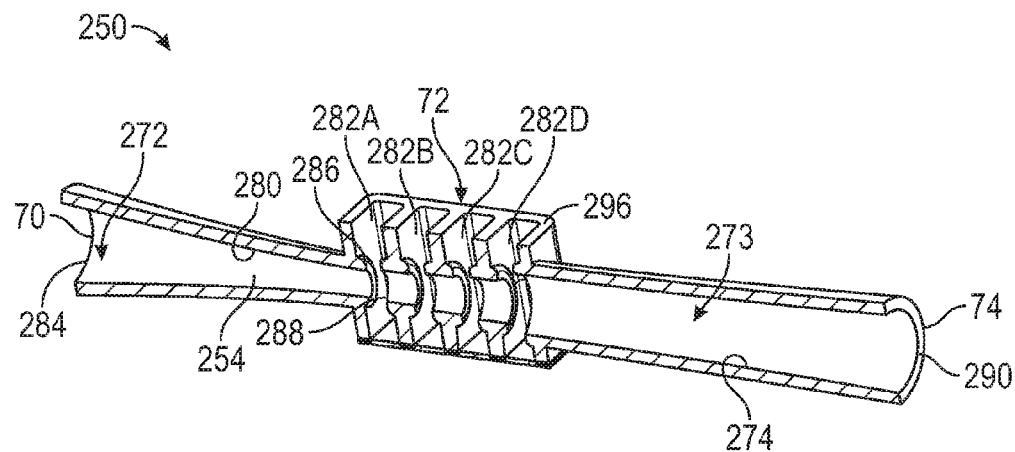
FIG. 5 is a cross-sectional view of the evacuator shown in FIG. 4.

FIGS. 4-5 illustrate yet another embodiment of a pneumatically actuated vacuum pump 250. In the embodiment as shown in FIGS. 4-5, the pneumatically actuated vacuum pump 250 includes the motive port 70 fluidly connected to and supplies compressed air from the compressor 42 (FIG. 1), the suction port 72 fluidly connected to the crankcase ventilation system 52 (FIG. 1), and the discharge port 74 fluidly connected to and discharges air to a pressure lower than boost pressure. Referring to FIG. 5, a passageway 254 of the pneumatically actuated vacuum pump 250 may include a first tapering portion 272 (also referred to as a motive cone) in a motive section 280 of the passageway 254. The passageway 254 may also include a second tapering portion 273 (also referred to as a discharge cone) in a discharge section 274 of the passageway 254. The first tapering portion 272 of the passageway 254 may include an inlet end 284 and an outlet end 286. Similarly, the second tapering portion 273 of the passageway 254 may also include an inlet end 288 and an outlet end 290.

As seen in FIG. 5, the first tapering portion 272 of the pneumatically actuated vacuum pump 250 may be fluidly coupled to the second tapering portion 273 by a Venturi gap 282A. The Venturi gap 282A may be a fluid junction that places the suction port 72 in fluid communication with the motive section 280 and the discharge section 274 of the pneumatically actuated vacuum pump 250. The inlet ends 284, 288 and the outlet ends 286, 290 of the passageway 254 of the pneumatically actuated vacuum pump 250 may include any type of profile, such as, but not limited to, a circular shape, an ellipse shape, or another polygonal form. Moreover, the gradually, continuously tapering inner diameter extending from inlet ends 284, 288 and the outlet ends 286, 290 of the passageway 254 may define a hyperboloid, paraboloid, or a cone. Some exemplary configurations for the outlet end 286 of the first tapering portion 272 and the inlet end 288 of the second tapering portion 273 are presented in FIGS. 4-6 of co-pending U.S. patent application Ser. No. 14/294,727, filed on Jun. 3, 2014, which is incorporated by reference herein in its entirety.

A plurality of additional gaps 282B, 282C, 282D may be located downstream of the Venturi gap 282A, along the second tapering portion 273 of the pneumatically actuated vacuum pump 250. In the embodiment, as shown in FIGS. 4-5, the pneumatically actuated vacuum pump 250 includes a total of four gaps, where three gaps 282B, 282C, 282D are located downstream of the Venturi gap 282A. It is to be understood that this illustration is merely one exemplary embodiment of the pneumatically actuated vacuum pump 250. Those skilled in the art will readily appreciate that any number of gaps may be located downstream of the Venturi gap 282A. A full description of the pneumatically actuated vacuum pump 250 is presented in co-pending U.S. patent application Ser. No. 14/452,651 filed on Aug. 6, 2014, which is incorporated by reference herein in its entirety. However, similar to the embodiment as shown in FIGS. 2-3, it is to be understood that the evacuator 250 does not include a check valve. In particular, it is to be understood that there is no check valve element located along a top surface 296 of the pneumatically actuated vacuum pump 250.

Figure 6:
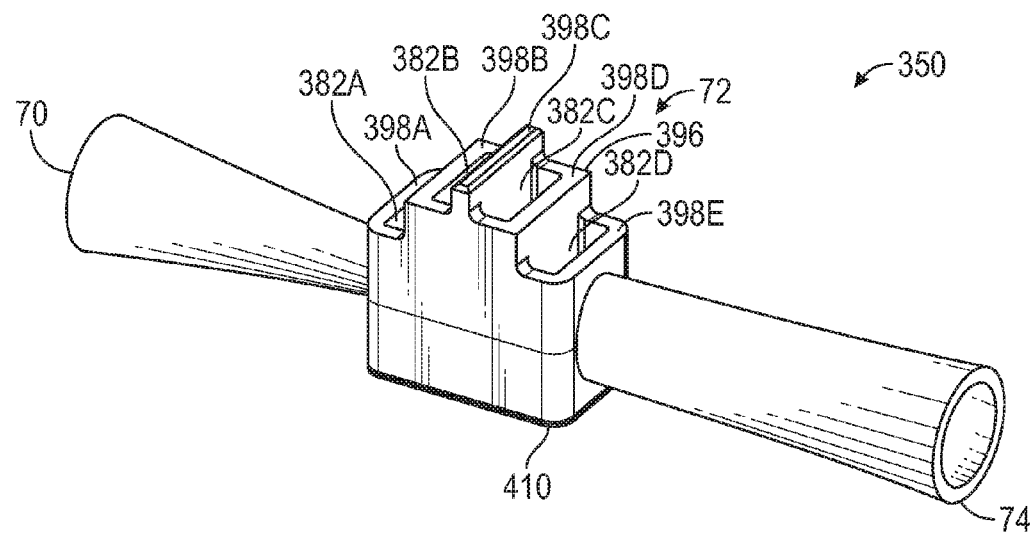
FIG. 6 is a perspective view of yet another embodiment of the evacuator shown in FIG. 1.
Figure 7:
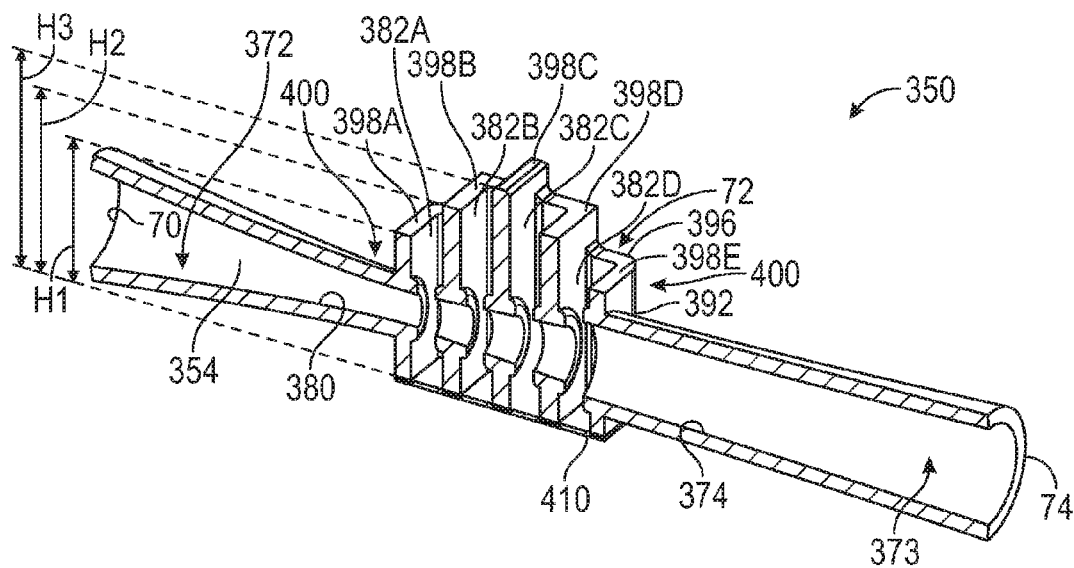
FIG. 7 is a cross-sectional view of the evacuator shown in FIG. 6.

FIGS. 6-7 illustrate still another embodiment of a pneumatically actuated vacuum pump 350. The pneumatically actuated vacuum pump 350 includes the motive port 70 fluidly connected to and supplies compressed air from the compressor 42 (FIG. 1), the suction port 72 fluidly connected to the crankcase ventilation system 52 (FIG. 1), and the discharge port 74 fluidly connected to and discharges air to a pressure lower than boost pressure. Similar to the embodiment as shown in FIGS. 4-5, the evacuator 350 also includes a passageway 354 defining a first tapering portion 372 in a motive section 380 of the passageway 354. The passageway 354 may also include a second tapering portion 373 in a discharge section 374 of the passageway 354. Moreover, similar to the embodiment as described above and shown in FIGS. 4-5, the pneumatically actuated vacuum pump 350 includes a Venturi gap 382A as well as a plurality of additional gaps 382B, 382C, 382D located downstream of the Venturi gap 382A along the second tapering portion 373 of the pneumatically actuated vacuum pump 350. Both pneumatically actuated vacuum pumps 250, as well as pneumatically actuated vacuum pump 350, include similar structure, except that the pneumatically actuated vacuum pump 350 includes a substantially pointed or "V" shaped profile along a top surface 396 of the pneumatically actuated vacuum pump 350. The profile of the pneumatically actuated vacuum pump 350 along the top surface 396 could also be referred to as a stepped configuration.

Continuing to refer to both FIGS. 6-7, a series of walls 398A, 398B, 398C, 398D, 398E of varying height define the Venturi gap 382A as well as the gaps 382B, 382C, 382D located downstream of the Venturi gap 382A. In particular, walls 398A, 398B, define the Venturi gap 382A. Walls 398B, 398C define gap 382B. Walls 398C, 398D define gap 382C. Walls 398D, 398E define gap 382D. Walls 398A and 398E are located at opposing ends 400 of a housing 392 of the pneumatically actuated vacuum pump 350. Also, walls 398A and 398E include a height H1 measured from a bottom surface 410 of the housing 392. Walls 398B and 398D include a height H2 from the bottom surface 410 of the housing 392, where height H2 is greater than height H1. Finally, wall 398C, which is centrally positioned between wall 398B and wall 398D, includes a height H3 measured from the bottom surface 410 of the housing 392. As seen in FIGS. 6-7, the height H3 of the wall 398C is greater than height H2 of the walls 398B and 398D. The walls 398A, 398B, 398C, 398D, 398E form the pointed profile located along the top surface 396 of the pneumatically actuated vacuum pump 350, and reduce or substantially eliminate the amount of cross-flow between the Venturi gap 382A and the gaps 382B, 382C, 382D.

Similar to the embodiments as shown in FIGS. 2-3 and 4-5 and described above, it is to be understood that the evacuator 350 also does not include a check valve. In particular, it is to be understood that there is no check valve element located along the top surface 396 of the pneumatically actuated vacuum pump 350.

Figure 9:
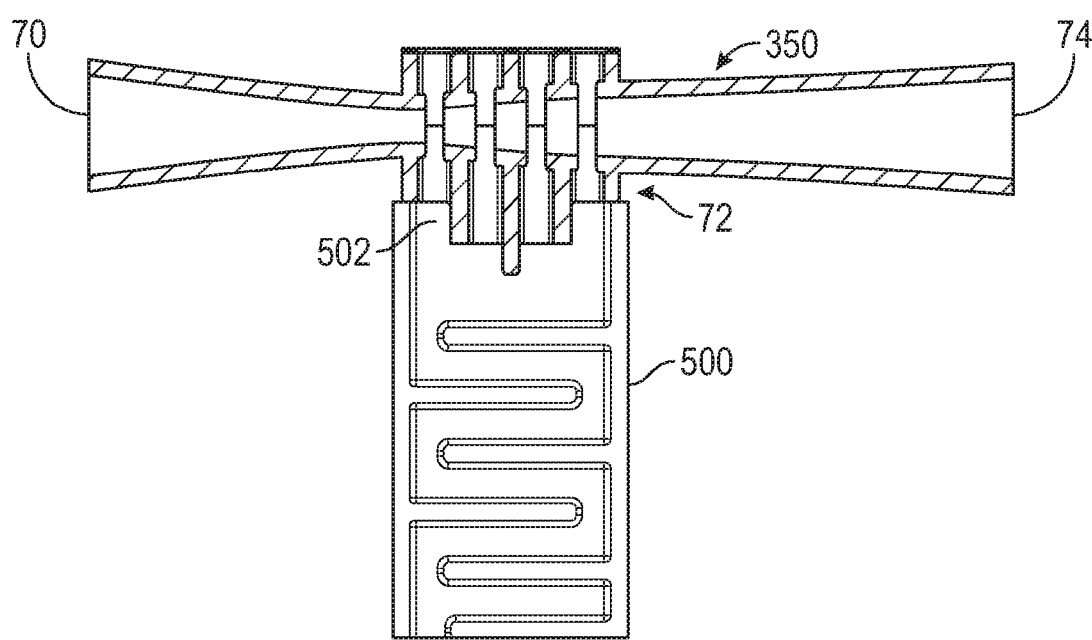
FIG. 9 illustrates the evacuator shown in FIGS. 4-5 connected to an outlet of an oil mist separator.

FIG. 8 is an illustration of the pneumatically actuated vacuum pump 250 assembled to an oil mist separator 500 of the crankcase ventilation system 52 (shown in FIG. 1). As seen in FIG. 8, the suction port 72 of the pneumatically actuated vacuum pump 250 is fluidly connected to an outlet 502 of the oil mist separator 500. FIG. 9 is an illustration of the pneumatically actuated vacuum pump 350, where the suction port 72 of the pneumatically actuated vacuum pump 350 is also fluidly connected to the outlet 502 of the oil mist separator 500.

Figure 10:
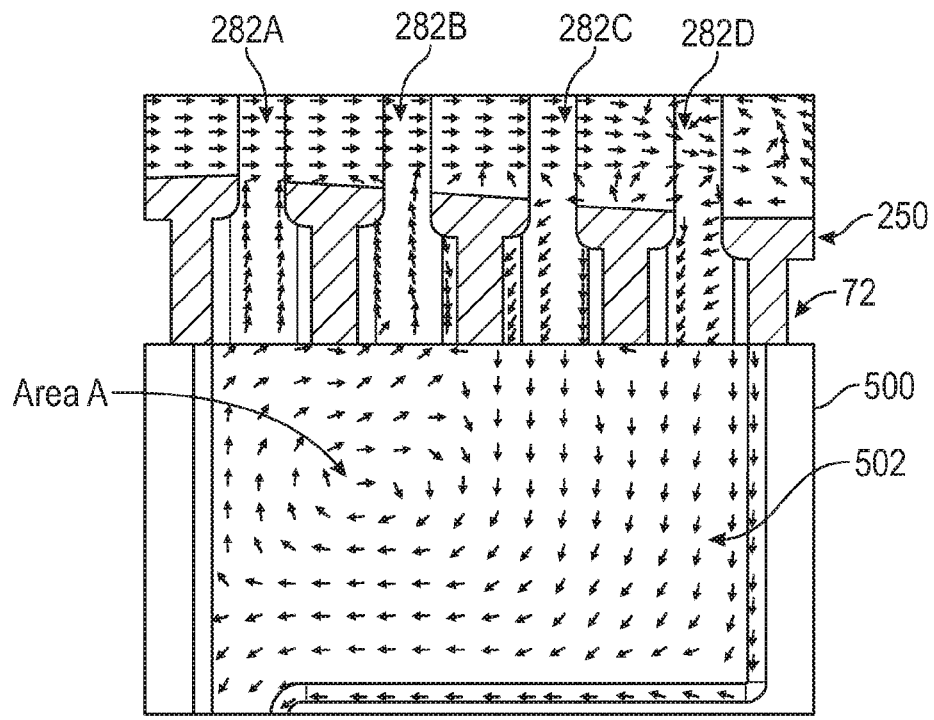
FIG. 10 is a vector diagram illustrating the flow of fluid in the evacuator shown in FIGS. 2-3 and the oil mist separator during a first operating condition.
Figure 11:
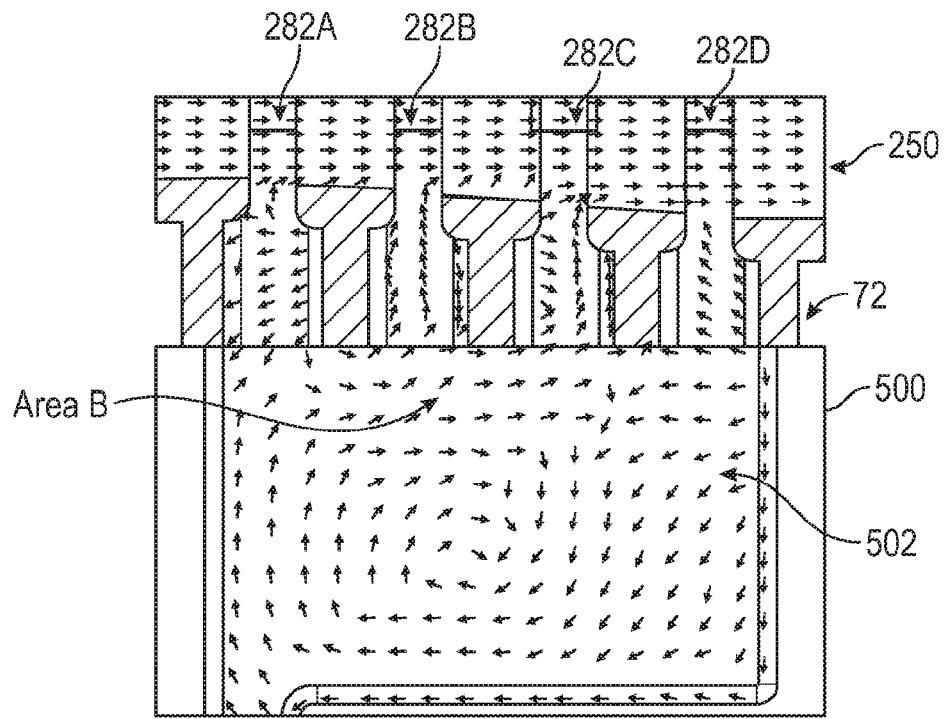
FIG. 11 is a vector diagram illustrating the flow of fluid in the evacuator shown in FIGS. 2-3 and the oil mist separator during a second operating condition.

FIGS. 10-11 are vector diagrams illustrating the flow of fluid between the suction port 72 of the evacuator 250 and the inlet 502 of the oil mist separator 500. The arrows illustrate the direction of fluid flow between the evacuator 250 and the inlet 502 of the oil mist separator 500. FIG. 10 is an illustration of the flow of fluid during a first operating condition where the pressure at the motive inlet 70 (shown in FIG. 1) of the evacuator 250 is at 4 kPa above atmospheric, and the pressure at the inlet 502 of the oil separator 502 is at 4 kPa below atmospheric. FIG. 11 illustrates a second operating condition, where the pressure at the motive inlet 70 (shown in FIG. 1) of the evacuator 250 is at 20 kPa above atmospheric, and the pressure at the inlet 502 of the oil separator 502 is at 4 kPa below atmospheric. As seen in FIG. 10, there is cross-flow in Area A of the oil mist separator 500, between the Venturi gap 282A and the gap 282B during the first operating condition. Turning to FIG. 11, there is cross-flow in Area B of the oil mist separator 500, between the Venturi gap 282A and the gap 282C during the second operating condition.

Figure 12:
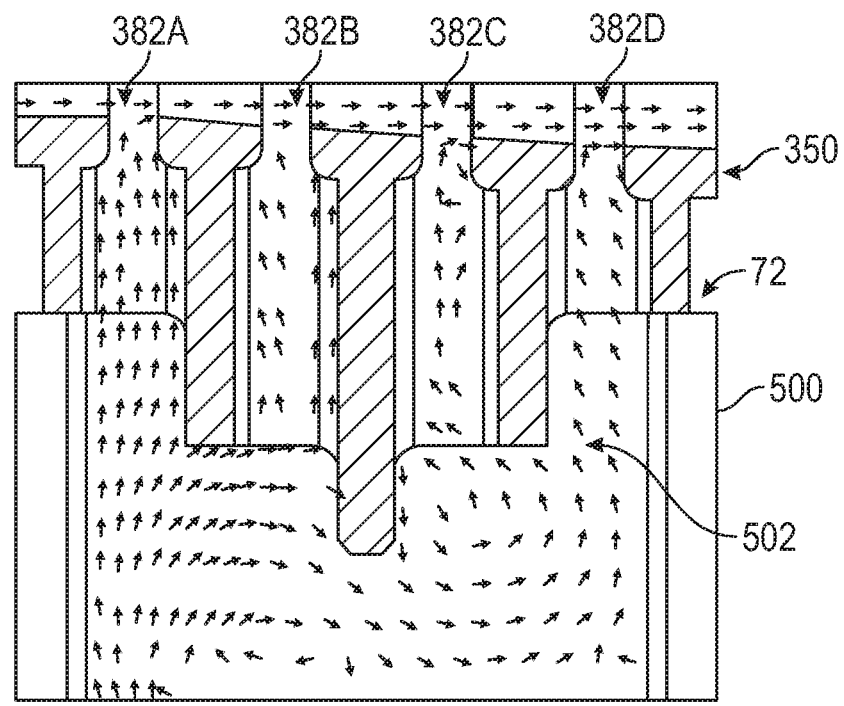
FIG. 12 is a vector diagram illustrating the flow of fluid in the evacuator shown in FIGS. 4-5 and the oil mist separator during the first operating condition.
Figure 13:
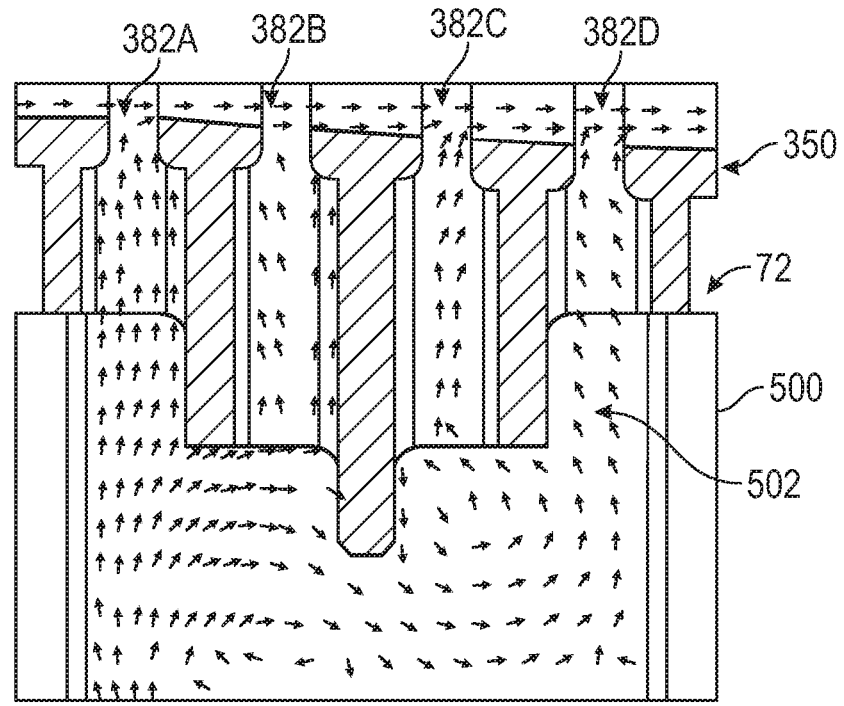
FIG. 13 is a vector diagram illustrating the flow of fluid in the evacuator shown in FIGS. 4-5 and the oil mist separator during the first operating condition.

FIGS. 12-13 are vector diagrams illustrating the flow of fluid between the suction port 72 of the evacuator 350 and the inlet 502 of the oil mist separator 500. Specifically, FIG. 12 is an illustration of the flow of fluid at the first operating condition, where the pressure at the motive inlet 70 (shown in FIG. 1) of the evacuator 350 is at 4 kPa above atmospheric, and the pressure at the inlet 502 of the oil separator 500 is at 4 kPa below atmospheric. FIG. 13 illustrates the second operating condition, where the pressure at the motive inlet 70 (shown in FIG. 1) of the evacuator 350 is at 20 kPa above atmospheric, and the pressure at the inlet 502 of the oil separator 500 is at 4 kPa below atmospheric. Referring generally to FIGS. 10-13, it is to be appreciated that the pointed profile of evacuator 350 results in substantially no cross-flow between the Venturi gap 382A as well as the gaps 382B, 382C, 382D of the evacuator 350.

Referring generally to the figures, the disclosed evacuators provide a relatively simple, cost-effective approach for providing vacuum at all operating conditions of a boosted engine to a crankcase ventilation system. Unlike some evacuators currently available today, the disclosed evacuators do not include any check valves to limit the flow of fluid within the turbocharged engine air system. However, the disclosed turbocharged engine air system may include two check valves located within separate conduits within the engine air system, which are both fluidly connected to the discharge port of the evacuator. The check valves ensure that a pressure at the converging motive section of the evacuator is always greater than a pressure at the diverging discharge section.

The embodiments of this invention shown in the drawings and described above are exemplary of numerous embodiments that may be made within the scope of the appended claims. It is contemplated that numerous other configurations of the disclosure may be created taking advantage of the disclosed approach. In short, it is the applicant's intention that the scope of the patent issuing herefrom will be limited only by the scope of the appended claims.

What is claimed is:

1. A turbocharged engine air system, comprising:
a crankcase ventilation system having an oil mist separator;
a turbocharger having a compressor fluidly connected to an intake manifold of an engine;
a first check valve located upstream of the compressor and a second check valve located downstream of the compressor and upstream of the intake manifold; and
an evacuator, comprising:
a converging motive section, a diverging discharge section, at least one suction port, and a first Venturi gap located between an outlet end of the converging motive section and an inlet end of the diverging discharge section;
wherein the diverging discharge section of the evacuator comprises a plurality of additional Venturi gaps;
wherein the diverging section is fluidly connected to both the first check valve and the second check valve, and the suction port is fluidly connected to an outlet end of the oil mist separator;
wherein the first Venturi gap and the plurality of additional Venturi gaps are separated from one another such that the plurality of Venturi gaps do not draw air from one another and only draw air from the oil mist separator;
wherein the first check valve and the second check valve ensure that a pressure at the converging motive section of the evacuator is always greater than a pressure at the diverging discharge section.

2. The turbocharged engine air system of claim 1, comprising a charge air cooler (CAC) located downstream from the compressor of the turbocharger.

3. The turbocharged engine air system of claim 2, comprising a first engine air connection located upstream of the CAC and downstream of the compressor of the turbocharger and a second engine air connection is fluidly connected to the diverging discharge section of the evacuator.

4. The turbocharged engine air system of claim 3, wherein a junction is located along the second engine air connection and is connected to the turbocharged engine air system at two discrete locations.

5. The turbocharged engine air system of claim 1, wherein the plurality of Venturi gaps define a surface, and wherein the surface includes a substantially pointed profile.

6. The turbocharged engine air system of claim 1, wherein the evacuator is constructed of a material that withstands temperatures of at least 200° C.

7. The turbocharged engine air system of claim 1, wherein the evacuator is constructed of one of polyphenylene sulfide (PPS), a metallic material, and polypropylene.

8. A turbocharged engine air system, comprising:
a crankcase ventilation system having an oil mist separator with an outlet;
a turbocharger having a compressor fluidly connected to an intake manifold of an engine;
a first check valve located upstream of the compressor and a second check valve located downstream of the compressor and upstream of the intake manifold; and
an evacuator, comprising:
a converging motive section, a diverging discharge section, at least one suction port, and a first Venturi gap located between an outlet end of the converging motive section and an inlet end of the diverging discharge section, wherein the diverging discharge section of the evacuator comprises a plurality of additional Venturi gaps;
wherein the diverging discharge section is fluidly connected to both the first check valve and the second check valve, and the suction port is fluidly connected to the outlet of the oil mist separator of the crankcase ventilation system, and
wherein the first Venturi gap and the plurality of additional Venturi gaps define a surface, and the surface includes a substantially pointed profile;
wherein the first check valve and the second check valve ensure that a pressure at the converging motive section of the evacuator is always greater than a pressure at the diverging discharge section.

9. The turbocharged engine air system of claim 8, comprising a charge air cooler (CAC) located downstream from the compressor of the turbocharger.

10. The turbocharged engine air system of claim 9, comprising a first engine air connection located upstream of the CAC and downstream of the compressor of the turbocharger and a second engine air connection is fluidly connected to the diverging discharge section of the evacuator.

11. The turbocharged engine air system of claim 10, wherein a junction is located along the second engine air connection and is connected to the turbocharged engine air system at two discrete locations.

12. The turbocharged engine air system of claim 8, wherein the first Venturi gap and the plurality of additional Venturi gaps are separated from one another such that each Venturi gap does not draw air from any of the others and only draw air from the oil mist separator.

13. The turbocharged engine air system of claim 8, wherein the evacuator is constructed of a material that withstands temperatures of at least 200° C.

14. The turbocharged engine air system of claim 8, wherein the evacuator is constructed of one of polyphenylene sulfide (PPS), a metallic material, and polypropylene.

15. A Venturi device assembly, comprising:
an evacuator, comprising:
a converging motive section;
a diverging discharge section;
a first Venturi gap located between an outlet end of the converging motive section and an inlet end of the diverging discharge section,
a plurality of additional Venturi gaps in the diverging discharge section downstream of the first Venturi gap;
wherein the first Venturi gap and the plurality of additional Venturi gaps define a surface having a stepped configuration; and
an oil mist separator with an outlet connected to the surface having the stepped configuration, the outlet being in fluid communication with the first Venturi gap and the plurality of additional Venturi gaps.

16. The Venturi device assembly of claim 15, wherein no check valve element is along the surface having the stepped configuration.

17. The Venturi device assembly of claim 15, wherein the surface having the stepped configuration has a plurality of walls defining the first Venturi gap and the plurality of additional Venturi gaps; wherein a wall of greatest height is located between the first Venturi gap and a most downstream Venturi gap.

18. The Venturi device assembly of claim 17, wherein the wall of greatest height is centrally position between the first Venturi gap and a most downstream Venturi gap.

\* \* \* \* \*